United States Patent [19]
Nakahara et al.

[11] Patent Number: 5,712,040
[45] Date of Patent: Jan. 27, 1998

[54] FLUORINE-CONTAINING RESIN MOLDED ARTICLES

[75] Inventors: Akihiko Nakahara; Junichiro Nakashima; Shinji Tokunaga; Tatsuo Esaki, all of Tokuyama, Japan

[73] Assignee: Tokuyama Corporation, Tokuyama, Japan

[21] Appl. No.: 672,034

[22] Filed: Jun. 26, 1996

[30] Foreign Application Priority Data

Jun. 26, 1995 [JP] Japan ................................ 7-159671

[51] Int. Cl.$^6$ .............................. B32B 27/14; B32B 7/00
[52] U.S. Cl. .................... 428/421; 428/34.7; 428/336; 428/422
[58] Field of Search ......................... 428/421, 422, 428/34.7, 336

[56] References Cited

U.S. PATENT DOCUMENTS

| | | | |
|---|---|---|---|
| 4,954,388 | 9/1990 | Mallouk et al. | 428/421 |
| 5,298,300 | 3/1994 | Hosoi et al. | 428/422 |
| 5,350,489 | 9/1994 | Muraoka | 156/651 |

*Primary Examiner*—Tae Yoon
*Attorney, Agent, or Firm*—Sherman and Shalloway

[57] ABSTRACT

The present invention relates to novel fluorine-contained resin molded articles having antistatic property, and specifically, the invention relates to fluorine-contained resin molded articles which exhibit good antistatic effect while maintaining properties inherent in the fluorine-contained resin and are fouled very little, owing to the provision of an antistatic layer of a fluorine-contained resin of which the surface resistivity is adjusted to be not larger than $10^{13}\Omega$ by making present the ion-exchange groups on the surface layer of a base material composed of a fluorine-contained resin which does not substantially contain ion-exchange group.

11 Claims, 1 Drawing Sheet

F I G. 1
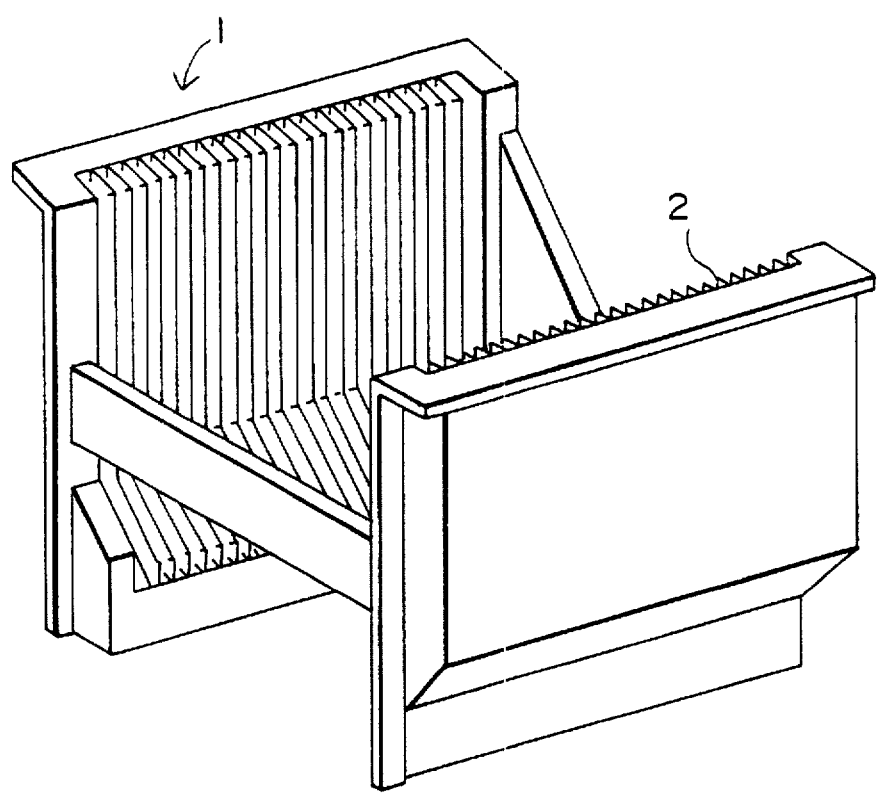

FLUORINE-CONTAINING RESIN MOLDED ARTICLES

(TECHNICAL FIELD)

The present invention relates to novel fluorine-containing resin molded articles having antistatic property. More specifically, the invention relates to fluorine-containing resin molded articles which exhibit good antistatic effect while maintaining properties inherent in the fluorine-containing resin and are fouled very little, owing to the provision of an antistatic layer of a fluorine-containing resin of which the surface resistivity is adjusted to be not larger than $10^{13}\Omega$ by making present the ion-exchange groups on the surface layer of a base material composed of a fluorine-contained resin which does not substantially contain ion-exchange group.

(BACKGROUND ART)

A fluorine-containing resin exhibits excellent resistance against chemicals and heat, excellent electrical insulating property and excellent resistance against being fouled, and has been used in a wide field of industries. However, the fluorine-containing resin has such a high surface electric resistance that it is easily electrified with static electricity, which is a serious defect.

For example, a wafer carrier made of a fluorine-contained resin used in the steps of producing semiconductors tends to adsorb fine particles suspended in the atmosphere due to electrifying property of the fluorine-contained resin. As a result, fine particles adsorbed by the wafer carrier contaminate the wafers held by the wafer carrier accounting for a high percent of the defective products obtained by using the wafers.

In a pipe for transporting inflammable fluids, static electricity is generated by the friction as the inflammable fluid passes through the pipe, creating a probability of catching fire.

There have heretofore been known a resin composition obtained by blending a fluorine-containing resin with an electrically conducting powder and a molded article composed of this composition in order to impart antistatic property to the molded article of the fluorine-contained resin. For instance, Japanese Laid-Open Patent Publication Nos. 37842/1986, 223255/1987 and 255751/1990 disclose methods of producing molded articles of a resin composition which is obtained by mixing a fluorine-containing resin such as tetrafluoroethylene or the like with carbon powder and carbon fiber powder, or electrically conducting powder such as of fibrous electrically conducting titanium oxide and zinc oxide.

Furthermore, Japanese Laid-Open Patent Publication No. 59864/1996 discloses a fluorine-containing resin molded article having an electrically conducting surface by treating the surface layer of the fluorine-containing resin molded article with plasma to form C=C bonding by cutting C—F bonding.

However, the molded article of the resin composition in which the electrically conducting powder is mixed must be blended with large amounts of the electrically conducting powder to impart antistatic property thereby producing, however, a problem in that the electrically conducting powder or impurities contained therein elute out from the fluorine-containing resin molded article. Such a problem invites a phenomenon in that a substance that comes into contact with the molded article is fouled. When the fluorine-containing resin molded article is used as a wafer carrier, in particular, the wafers held by the wafer carrier are fouled by particles due to the electrically conducting powder that has eluted out. When used for a pipe for transporting fluid, furthermore, particles due to the electrically conducting powder that eluted out from the fluorine-containing resin, may contaminate the fluid.

When the molded article as a whole is constituted by the fluorine-containing resin containing the electrically conducting powder, the electrically insulating property and resistance against fouling inherent in the fluorine-containing resin are impaired imposing limitation upon its use in the applications where such properties are required.

In order to impart hydrophilic property to the fluorine-containing resin molded articles, on the other hand, Japanese Laid-Open Patent Publication No. 98641/1989 discloses a method of graft-polymerizing a hydrophilic monomer containing an ion-exchange group on the surface of a porous tube of a fluorine-containing resin based upon the irradiation with radioactive rays.

When the hydrophilic monomer is introduced by the graft-reaction in order to impart hydrophilic property, however, it is difficult to introduce the monomer quantitatively and in large amounts since the fluorine-containing resin belongs to a resin of the decomposition type in this reaction. Therefore, the ion-exchange groups are imparted to a depth of as thin as about several hundreds angstroms from the surface at the greatest. With the surfaces of the fluorine-containing resin molded article being irradiated with radioactive rays, furthermore, the decomposed resin may turn into a cause of producing particles.

As a result, the fluorine-containing resin molded article fails to exhibit sufficiently decreased surface electric resistance, and leaves much room for improvement with respect to antistatic effect and foul-preventing property.

(DISCLOSURE OF THE INVENTION)

Therefore, it is a first object of the present invention to provide a fluorine-containing resin molded article which exhibits good antistatic effect in a sustained manner over extended periods of time and permits very little fouling substances such as particles from the molded article and the like from eluting out.

A second object of the present invention is to provide wafer carriers, tubes and films by utilizing the properties of the fluorine-containing resin molded article.

Further objects and advantages of the present invention will become obvious from the following description.

According to the present invention, the above-mentioned objects and advantages can be accomplished by forming, on the surface of a base material composed of a fluorine-containing resin without substantially containing ion-exchange group, an antistatic layer composed of a fluorine-containing resin in which are made present ion-exchange groups so as to exhibit a predetermined surface electric resistance.

That is, the present invention is concerned with a fluorine-containing resin molded article having, on the surface of a base material composed of a fluorine-containing resin without substantially containing ion-exchange group, an antistatic layer composed of a fluorine-containing resin of which the surface resistivity is adjusted to be not larger than $10^{13}\Omega$ by making present the ion-exchange groups.

The invention further provides wafer carriers, tubes and films of the above-mentioned fluorine-containing resin molded articles.

(BRIEF DESCRIPTION OF THE DRAWING)

FIG. 1 is a perspective view illustrating a typical structure of a wafer carrier constituted by a fluorine-containing resin molded article of the present invention, wherein reference numeral 1 denotes a main body of the wafer carrier, and 2 denotes grooves for holding wafers.

(DETAILED DESCRIPTION OF THE INVENTION)

In the present invention, the base material composed of a fluorine-containing resin does not substantially contain ion-exchange group. That is, when a base material composed of a resin having ion-exchange groups is immersed in a solvent or in a chemical solution, the molded article that is obtained therefrom swells causing a change in the size thereof and besides adsorbs and permits the permeation of ions, inorganic matters or organic matters. When the molded article is used as a wafer carrier, therefore, a problem arises in regard to fouling the wafers that come into contact therewith. For instance, there have been known a fluorinated ion-exchange membrane and an ion-exchange resin as fluorine-containing resin materials having ion-exchange groups. These resins, however, are to permeate or adsorb ions, and usually have ion-exchange groups in amounts of about ten and several mol %. In a field where resistance against fouling which is a feature of the fluorine-containing resin is required as represented by the wafer carrier, therefore, it is desired to suppress properties for adsorbing organic matters and ions which are possessed by the fluorine-type ion-exchange membrane or the ion-exchange resin. Even in the applications of molded articles such as films and tubes composed of the fluorine-contained resin requiring antistatic property, it is desired to suppress properties for permeating and adsorbing ions, inorganic matters such as water and organic matters such as alcohols.

Therefore, the fluorine-containing resin can be used as the base material of the present invention without limitation provided it does not contain ion-exchange groups or contains ion-exchange groups in amounts that do not arouse the above-mentioned problem. The amount of the ion-exchange groups in the fluorine-containing resin that serves as a base material cannot be exclusively specified since the required dimensional stability, adsorbing property and permeating property vary depending upon the applications. In general, however, the amount of ion-exchange groups is smaller than 0.20 mol % and, particularly, not larger than 0.1 mol % reckoned as a monomer that contains ion-exchange groups.

In this specification, the amount of the ion-exchange groups contained in the fluorine-containing resin is expressed as a composition of the ion-exchange groups relative to the monomer units of the whole monomers.

From the standpoint of not causing fouling when the molded article is in use, it is desired that the fluorine-containing resin constituting the base material of the present invention does not substantially contain even fillers from which additives may elute out. Or, it is desired that the filler that does not elute out is added in an amount that does not seriously deteriorate the properties of the fluorine-containing resin base material.

According to the present invention, concrete examples of the fluorine-containing resin that can be preferably used as the base material may include a polytetrafluoroethylene, a copolymer of a tetrafluoroethylene and an alkyl vinyl ether and/or a monomer (hereinafter referred to as a precursor monomer) having a functional group that can be converted into an ion-exchange group that will be described later, a copolymer of a tetrafluoroethylene and a hexafluoropropylene and/or a precursor monomer, a polymonochlorotrifluoroethylene, a copolymer of a tetrafluoroethylene and a perfluorodimethyl dioxole, and a polyperfluoroalkenyl vinyl ether.

The above-mentioned alkyl vinyl ether is a perfluoroalkyl vinyl ether or a polyfluoroalkyl vinyl ether having hydrogen atoms. Concretely speaking, the alkyl vinyl ether is represented by the general formula,

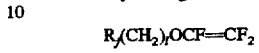

$$R_f(CH_2)_l OCF=CF_2$$

wherein $R_f$ is a perfluoroalkyl group, and l is 0 or 1.

It is desired that the alkyl vinyl ether is used in such an amount that the amount of hydrogen atoms in the obtained copolymer is not larger than 0.2% by weight and, preferably, not larger than 0.15% by weight.

Among the above-mentioned fluorine-containing resins, perfluorocarbon-type resins such as a polytetrafluoroethylene, a copolymer of a tetrafluoroethylene and a perfluoroalkyl vinyl ether, and a copolymer of a tetrafluoroethylene and a hexafluoropropylene, are preferably used from the standpoint of resistance against heat, resistance against chemicals and resistance against fouling.

In the present invention, the antistatic layer formed on the surface of the base material comprises a fluorine-containing resin of which the surface resistivity is adjusted to be not larger than $10^{13} \Omega$ and, preferably, not larger than $10^{10} \Omega$ by making present the ion-exchange groups.

In the present invention, the surface resistivity was measured in compliance with the method specified under JIS K-6911.

The antistatic layer is formed on the surface of the base material composed of a fluorine-containing resin without substantially containing ion-exchange group in order to lower the surface resistivity. Compared with conventional means for imparting antistatic property by adding an electrically conducting substance, therefore, very little particles are produced from the surfaces, which is very useful for the applications such as wafer carriers where fouling of articles upon contact therewith becomes a problem. Moreover, the fluorine-containing resin which is a base material exhibits sufficiently large strength since it does not contain large amounts of additives, and is best suited for the applications such as the wafer carriers on which are exerted physical load. As compared with an ion-exchange resin containing ion-exchange groups, furthermore, the impurity ions do not infiltrate into the interior thereof. Therefore, the fluorine-containing resin adsorbs impurity ions in small amounts and the articles that come in contact with the fluorine-contained resin molded article are very little fouled with impurity ions.

The fluorine-containing resin molded article of the present invention was measured for its amount of adsorbing chemical liquid in compliance with a method that will be described later to be not larger than 50 ppb/cm³ and, particularly, not larger than 10 ppb/cm³.

From this fact, it will be understood that the fluorine-containing resin molded article of the present invention is best suited for the applications such as wafer carriers where fouling is a problem.

When the antistatic layer of the fluorine-contained resin in which are made present ion-exchange groups exhibits a surface resistivity which is larger than $10^{13} \Omega$, the obtained fluorine-contained resin molded article exhibits insufficient antistatic effect. When the fluorine-contained resin molded article is, for example, a wafer carrier, static electricity builds up on the surface to collect particles which are suspended in very small amounts in a clean room, and the wafer held by the carrier is fouled with the particles.

As the ion-exchange groups made present in the antistatic layer, known ion-exchange groups bonded to the fluorine-contained resin can be used without any limitation.

For instance, there can be exemplified a widely known perfluoro cation-exchange group and a polyfluoro anion-exchange group. Concrete examples of the perfluoro cation-exchange group include perfluorosulfonic acid group and perfluorocarboxylic acid group (these perfluorosulfonic acid group and perfluorocarboxylic acid group will be hereinafter simply referred to as cation-exchange groups). A polyfluoro quaternary ammonium group (hereinafter simply referred to as anion-exchange group) can be raised as the polyfluoro anion-exchange group. These ion-exchange groups are chemically bonded to the fluorine-contained resin via a perfluorocarbon chain or a perfluoroether chain.

If these ion-exchange groups are described in further detail, the perfluorosulfonic acid group is represented by the following general formula,

—CFRFSO$_3$M wherein RF is F or CF$_3$, and M is a hydrogen atom, an alkali metal or a group represent by —N(R')$_4$ (where R' is a hydrogen atom or a lower alkyl group),
the perfluorocarboxylic acid group is represented by the following general formula,

—CFRFCO$_2$M wherein RF and M are as defined above, and the anion-exchange group is represented by,

—CFRFCH$_2$N$^+$R''$_3$Q$^-$ wherein RF is as defined above, and R' is a hydrogen atom or an alkyl group having 1 to 5 carbon atoms, and Q is a halogen atom.

Among these ion-exchange groups, the anion-exchange groups generally have lower resistance against chemicals than that of the cation-exchange groups. It is therefore preferred to use the cation-exchange groups. The perfluorosulfonic acid group exhibits good heat resistance compared with the perfluorocarboxylic acid group. When the counter ions to be bonded are hydrogen ions, the perfluorosulfonic acid group exhibits higher antistatic property than the perfluorocarboxylic acid group, and is desired.

In the present invention, the antistatic effect based upon the ion-exchange group can be confirmed by way of voltage attenuation factor. Desirably, the voltage attenuation factor is not smaller than 70% and, preferably, not smaller than 90% after one second from the application of a voltage of 10 kV for one minute.

There is no particular limitation on the means for adjusting the surface resistivity of the antistatic layer to lie within the above-mentioned range provided the ion-exchange groups are contained in the fluorine-contained resin. In general, the concentration of ion-exchange groups in the fluorine-contained resin in the antistatic layer should be not smaller than 0.25 mol %, preferably, from 0.25 to 20 mol % and, more preferably, from 0.25 to 18 mol %. When the amount of the ion-exchange groups is smaller than 0.25 mol %, the antistatic property is not exhibited to a sufficient degree even when the thickness is increased and it becomes difficult to stably impart antistatic property. When the amount of the ion-exchange groups is larger than 20 mol %, on the other hand, the fluorine-containing resin adsorbs water and impurity ions to an excessive degree, or swells upon contact with the water or alcohols, though good antistatic property is exhibited. Therefore, the fluorine-contained resin molded article is deformed and the antistatic layer is partly peeled, which is not desirable.

In the antistatic layer of the present invention, the ion-exchange groups are chemically bonded to the side chain of the fluorine-containing resin. Therefore, the antistatic effect is sustained for very extended periods of time, and is neither lost nor decreased even when the antistatic layer is contacted to a liquid for extended periods of time.

In the antistatic layer, furthermore, the ion-exchange groups may be made present either uniformly in the antistatic layer in the direction of depth thereof or in a manner that the concentration of the ion-exchange groups decreases continuously or stepwisely in the direction of depth of the antistatic layer from the surface thereof. In the latter case, the antistatic layer has such a gradient of concentration as to include a layer of the fluorine-contained resin in which the amount of ion-exchange groups is not smaller than 0.25 mol %.

In the above-mentioned aspect, it is desired that the antistatic layer which contains the ion-exchange groups at a concentration of not smaller than 0.25 mol % has a thickness of not smaller than 1 μm and, preferably, not smaller than 10 μm from the standpoint of accomplishing the above-mentioned surface resistivity. That is, when the thickness of the above-mentioned layer is smaller than 1 μm, the antistatic layer fails to exhibit antistatic property to a sufficient degree, and it becomes difficult to stably impart the antistatic property to the fluorine-containing resin molded article. Though there is no upper limit on the thickness of the antistatic layer, any problem does not occur from the standpoint of antistatic property even when the antistatic layer is very thick.

When the antistatic layer containing ion-exchange groups at a concentration of not smaller than 0.25 mol % has too large thickness, however, the fluorine-containing resin molded article loses strength or adsorbs the water and impurity ions since ion-exchange groups exist deep inside therein.

When the fluorine-containing resin molded article of the present invention is used for the applications of wafer carriers and the like as will be described later, therefore, it is desired that part of the antistatic layer containing the ion-exchange groups at a concentration of not smaller than 0.25 mol % has an upper-limit thickness of not larger than 50%, preferably, not larger than 40% and, more preferably, not larger than 30% with respect to the thickness of the base material. In particular, the upper-limit thickness of the antistatic layer is an absolute thickness which may, desirably, be not larger than 500 μm, more desirably, not larger than 200 μm and, particularly desirably, not larger than 100 μm.

When the fluorine-containing resin molded article is used for thin articles such as films and sheets that will be described later, or for such applications as tubes and pipes, it is desired that the upper-limit thickness of the layer is so controlled that the base material has a thickness of not smaller than 10 μm, so that the fluorine-contained resin exhibits insulating property, property for inhibiting permeation of ions and resistance against chemicals to a sufficient degree.

In the present invention, the antistatic layer is usually formed on the whole surface of the molded article. Depending upon the applications, however, the antistatic layer may be formed only on part of the surfaces of the molded articles.

For instance, the antistatic layer may be formed on one surface of thin articles such as films and sheets, or on the inner surface or on the outer surface of the tubes and pipes, the other surface without being provided with the antistatic layer. This can be favorably applied to such applications where the static electricity becomes a problem on one surface of the fluorine-containing resin molded article but does not become a problem on the other surface.

According to the present invention, the thickness of the antistatic layer, amount of ion-exchange groups and thickness of the base material can be learned by measuring the infrared absorption spectrum (hereinafter referred to as IR spectrum). That is, the film is perpendicularly cut from the surface of the fluorine-containing resin molded article of the invention into a depth of several tens to several hundreds of microns, and the IR transmission or reflection spectrum is measured every after a step of several microns. Or, the surface of the fluorine-contained resin molded article of the invention is ground into a depth of several to several tens of microns and the ground surface is measured for its reflection spectrum. When there exist ion-exchange groups, characteristic absorptions due to the groups will be observed; i.e., perfluorosulfonate group (—S$_3$Na), perfluorocarboxylate group (—CO$_2$Na) and perfluorocarboxylic acid group (—CO$_2$H) will be observed near 1060 cm$^{-1}$, near 1680 cm$^{-1}$ and near 1780 cm$^{-1}$. The thickness of the antistatic layer can be determined from these absorbing portions, and the amount of the ion-exchange groups can be determined from the intensity of absorption.

When there exists no ion-exchange group, on the other hand, these characteristic absorptions are not observed. Instead, absorptions due to polytetrafluoroethylene, a copolymer of tetrafluoroethylene and alkyl vinyl ether, a copolymer of tetrafluoroethylene and hexafluoropropylene, and polymonochlorotrifluoroethylene are observed over 1200 to 1300 cm$^{-1}$, absorptions due to perfluorosulfonic acid fluoride group (—SO$_2$F), perfluorocarboxylic acid chloride group (—CO$_2$Cl), perfluorocarboxylic acid ester group (—CO$_2$CH$_3$) and perfluorocyano group (—CN) are observed near 1420 cm$^{-1}$, near 1710 cm$^{-1}$, near 1780 cm$^{-1}$ and near 2100 cm$^{-1}$ as absorptions due to groups that can be converted into ion-exchange groups. These absorbing portions can be regarded to be thicknesses of the layers.

There is no particular limitation on the concrete shape of the fluorine-containing resin molded article of the present invention. For instance, the fluorine-containing resin of the invention can be molded into a structure like a wafer carrier as shown in FIG. 1, into tubular shapes such as tubes and pipes, and into thin articles such as sheets and films.

Though there is no particular limitation on the method of producing fluorine-containing resin molded articles, described below are preferred methods of production.

1. A method of producing a fluorine-containing resin molded article of which the base material is composed of a precursor and having an antistatic layer formed on the surface thereof by molding a fluorine-containing resin having a group that can be converted into an ion-exchange group (such a resin is simply referred to as precursor) into an article, and converting, into an ion-exchange group, the group that can be converted into an ion-exchange group that is present in the precursor within a predetermined range of thickness from the surface of the molded article to thereby form an antistatic layer (production method 1).

2. A method of producing a fluorine-containing resin molded article of which the base material comprises a mixture of a precursor and a fluorine-containing resin without substantially having a group that can be converted into an ion-exchange group and an ion-exchange group, and having an antistatic layer formed on the surface thereof, by molding the mixture of the precursor and the fluorine-containing resin without substantially having a group that can be converted into an ion-exchange group and an ion-exchange group into an article, and converting, into an ion-exchange group, the group that can be converted into an ion-exchange group that is present in the precursor within a predetermined range of thickness from the surface of the molded article (production method 2).

3. A method of producing a fluorine-containing resin molded article in which an antistatic layer is formed on the surface of a base material which comprises a fluorine-containing resin without substantially having a group that can be converted into an ion-exchange group and an ion-exchange group, by molding the fluorine-contained resin without substantially having a group that can be converted into an ion-exchange group and an ion-exchange group into an article, melt-adhering the above-mentioned precursor maintaining a predetermined thickness onto the surface of the molded article, and converting, into an ion-exchange groups, the group that can be converted into an ion-exchange group that is present in the precursor (production method 3).

4. A method of producing a multi-layer fluorine-containing resin molded article having an antistatic layer formed maintaining a predetermined thickness on the surface of a base material which comprises a fluorine-containing resin without substantially having a group that can be converted into an ion-exchange group and an ion-exchange group, by extruding the fluorine-containing resin without substantially having a group that can be converted into an ion-exchange group and an ion-exchange group and the precursor to form multiple layers and, then, converting into an ion-exchange groups, the group that can be converted into an ion-exchange group that is present in the precursor to thereby form an antistatic layer (production method 4).

Therefore, the fluorine-containing resin molded article of the present invention can be produced by selecting any desired production method depending upon the object of use, kind of resin to be used, etc. In this case, in order to form the antistatic layer maintaining good precision in the thickness, the production methods 3 and 4 can be selected out of the above-mentioned production methods.

The production methods will now be described in detail.

The method of forming the fluorine-containing resin having ion-exchange groups for constituting the antistatic layer comprises copolymerizing a fluoroolefin and a monomer having a group that can be converted into an ion-exchange group, and converting the group that can be converted into the ion-exchange group into the ion-exchange group. The fluorine-containing resin having the ion-exchange group obtained by this method is represented by the following general formula,

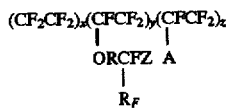

wherein R is a perfluorocarbon chain or a perfluoroether chain and is concretely, —(CF$_2$)$_m$— wherein m is an integer of from 2 to 10,
or

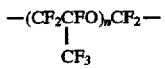

wherein n is an integer of from 1 to 3, RF is as described above, Z is $SO_3M$ or $CO_2M$ (where M is as described above), and A is $-CF_3$, $-O(CF_2)_dCF_3$, $-OCH_2(CF_2)_eCF_3$ (where d is 0 or an integer of from 1 to 7, e is an integer of from 1 to 7), or a chlorine atom.

The fluorine-containing resin having a group that can be converted into an ion-exchange group concretely and preferably used in the production method 1, can be produced by the copolymerization of a tetrafluoroethylene and a monomer having a group that can be converted into an ion-exchange group. In order to improve moldability and physical properties of the copolymer, in this case, the tetrafluoroethylene may be blended with not more than 30 mol % of a hexafluoropropylene, alkyl vinyl ethers represented by the following general formula, $$CF_2=CFO(CH_2)_aC_bF_{2b+1}$$

wherein a is 0 or 1, and b is an integer of from 1 to 10, or a monochlorotrifluoroethylene.

As the monomer having a group that can be converted into an ion-exchange group, there can be preferably used a monomer of the following general formula having a group that can be converted into a perfluorosulfonic acid ion-exchange group, $$CF_2=CFO[CF_2CF(CF_3)O]_oCF_2CFRFSO_2X$$

wherein X is F or Cl, RF is F or $CF_3$, and o is an integer of from 1 to 3.

As the monomer having a group that can be converted into a perfluorocarboxylic acid ion-exchange group, there can be used a monomer represented by the following general formula, $$CF_2=CFO[CF_2CF(CF_3)O]_p(CF_2)_qY$$

wherein Y is $CO_2R$ (wherein R is a lower alkyl group), CN, COF, COCl, p is an integer of from 1 to 3, and q is an inter of from 2 to 8,
or by the following general formula, $$CF_2=CFO(CF_2)_rOCF(CF_3)Y$$

wherein Y is $CO_2R$ (wherein R is a lower alkyl group), CN, COF, COCl, and r is an integer of from 2 to 8.

Described below are concrete examples of the monomers having a group that can be converted into an ion-exchange group:

$CF_2=CFOCF_2CF_2SO_2F$,
$CF_2=CFOCF_2CF(CF_3)OCF_2CF_2SO_2F$,
$CF_2=CFOCF_2CF(CF_3)OCF_2CF(CF_3)OCF_2CF_2SO_2F$,
$CF_2=CFOCF_2CF(CF_3)SO_2F$,
$CF_2=CFOCF_2CF(CF_3)OCF_2CF(CF_3)SO_2F$,
$CF_2=CFO(CF_2)_{3-8}CO_2CH_3$,
$CF_2=CFOCF_2CF_2OCF_2CF(CF_3)CO_2CH_3$.

These monomers may be used in a single kind or being mixed together.

Copolymerization of the tetrafluoroethylene with the monomer having a group that can be converted into an ion-exchange group can be accomplished by a known method without limitation. That is, the best polymerization may be selected out of the solution polymerization method, suspension polymerization method and emulsion polymerization by taking conditions such as copolymerizing properties into consideration.

In any case, the copolymerization is carried out by dissolving the tetrafluoroethylene in a dispersion or solution of the monomer having a group that can be converted into an ion-exchange group under the application of pressure. When another monomer is used in addition to the monomer having a group that can be converted into an ion-exchange group and the tetrafluoroethylene, the polymerization may be carried out by mixing the other monomer into the tetrafluoroethylene when it is a gaseous hexafluoropropylene or the like or by mixing the other monomer into the monomer having a group that can be converted into an ion-exchange group when it is a liquid alkyl vinyl ether or the like.

In the case of the, emulsion polymerization or the suspension polymerization without using organic solvent, water is favorably used as a dispersing medium. In the case of the solution polymerization and the suspension polymerization using an organic solvent, on the other hand, the organic solvent works as a chain transfer agent, whereby the polymer loses its molecular weight and the resulting copolymer exhibits deteriorated properties. It is therefore desired to use a solvent which is a fluorine-type liquid. Concrete examples include perfluoroalkanes such as perfluorobutane, perfluoropentane, perfluorohexane, perfluoroheptane, perfluorooctane and the like; perfluorocycloalkanes such as perfluorocyclobutane, perfluorocyclohexane and the like; perfluoroethers; perfluoro tertiary amines such as perfluorotributylamine and the like; perfluoromorpholines; and chlorofluoroethanes such as trifuloromonochloroethane and the like.

In the case of the emulsion polymerization, a persulfate such as ammonium persulfate is favorably used as a polymerization initiator. In the case of the solution polymerization and the suspension polymerization, a known Organic radical generator is used. By taking the heat resistance of the obtained copolymer into consideration, however, diacyl peroxides of the fluorine type are favorably used. Concrete examples include $(CF_3CF_2CO_2)_2$, $(HCF_2CF_2CO_2)_2$, $(ClCF_2CF_2CO_2)_2$, $(CF_3CF_2CF_2CO_2)_2$, and $(CF_3CF_2CF_2OCF(CF_3)CO_2)_2$.

The pressure of the fluoroolefin during the polymerization may vary depending upon the monomer composition and the polymerization temperature and cannot be exclusively determined but is desirably from 1 to 30 kg/cm²-G. The polymerization temperature varies depending upon the decomposition temperature of the polymerization initiator and cannot be exclusively determined but is usually from 0° to 100° C., and is preferably from 0° to 50° C. When a diacyl peroxide of the fluorine type is used as the polymerization initiator.

The thus obtained copolymer of the tetrafluoroethylene and the monomer having a group that can be converted into an ion-exchange group, can be molded into shaped articles, tubes, pipes, sheets and films through injection molding, extrusion molding, transfer molding or compression molding. The copolymer of the fluoroolefin and the ion-exchanging monomer exhibits different rigidity when it is molded into an article depending upon its composition. Therefore, the composition that meets the application may be selected depending upon the rigidity.

According to the method 2 of producing the fluorine-contained resin molded article of the present invention, the fluorine-contained resin having a group that can be converted into an ion-exchange group concretely described in connection with the production method 1 and the fluorine-containing resin without having ion-exchange group or the fluorine-contained resin described with reference to the base material resin are mixed together, and are molded to obtain a molded article.

When a polytetrafluoroethylene is used as the base material resin, however, the molded article is not obtained by the ordinary injection molding or the extrusion molding, but is obtained by a method based upon the compression molding.

According to the method 3 of producing the fluorine-containing resin molded article of the present invention, a powder or a dispersion of the precursor is applied onto the surface of the base material by the electrostatic application method, immersion application method or spray application method, followed by heating and melt-adhesion to obtain a molded article.

It is also allowable to obtain the molded article by applying, by the above-mentioned electrostatic application method or the like method, a powder or a dispersion of the precursor into a metal mold having an inner surface formed to match with the shape of the base material to form the layer of the precursor, and introducing the base material into the metal mold followed by heating in order to melt-adhere the layer of the precursor to the base material.

Depending upon the applications in this case, the melting point of the copolymer of the tetrafluoroethylene and the monomer having a group that can be converted into an ion-exchange group may be set to be lower than the melting point of the base material resin by about 10° C. and, preferably, by about 20° C., so that the precursor is melt-adhered by heating onto the base material resin without causing its shape to be changed. In order to obtain such a copolymer, it is desired that the content of the monomer having a group that can be converted into an ion-exchange group is not smaller than 4 mol % and, preferably, is 6 to 20 mol % when it is a bicopolymer of the tetrafluoroethylene and the monomer having a group that can be converted into an ion-exchange group. It is further allowable to add such components as alkyl vinyl ether or hexafluoropropylene to the system in order to lower the melting point to a desired level. A sheet-like molded article can be obtained by lining the base material resin with the copolymer that is molded into a sheet according to the production method 1, followed by melt-adhesion by heating.

According to the method 4 of producing the fluorine-containing resin molded article of the present invention, a powder or a dispersion of the fluorine-contained resin having a group that can be converted into an ion-exchange group concretely described with reference to the production method 1 is extruded together with the base material resin to obtain a laminate. In this case, when a resin that cannot be melt extrusion-molded by an ordinary method such as polytetrafluoroethylene is used as a base material resin, there can be selected a method of extrusion-laminating a fluorine-containing resin having a group that can be converted into an ion-exchange group as concretely described with reference to the production method 1 onto the polytetraluoroethylene that has been molded in advance. When a resin that can be melt-molded in an ordinary manner is used as a base material resin, there can be further employed a coextrusion method which laminates two kinds of resins one upon the other while melt-extruding them in addition to employing the above-mentioned extrusion-laminating method. As required, furthermore, the laminate consisting of three or more layers can be obtained by this production method.

Under an alkaline condition that is usually used, it is desired to employ a hydrolysis reaction to convert into cation-exchange groups, the groups that can be converted into ion-exchange groups in the fluorine-containing resin molded article produced by the above-mentioned production methods. The hydrolysis reaction is carried out by immersing the molded article in an aqueous solution which contains several to several tens of percent of an alkali such as NaOH, KOH, tetraalkylammonium hydroxide or the like, and heating it at room temperature to 100° C. for several hours to a hundred and several tens of hours. Addition of an organic solvent such as methanol, ethanol or dimethyl sulfoxide is effective in promoting the hydrolysis.

According to the present invention, the thickness of the antistatic layer plays an important role from the standpoint of developing the effect of the invention. In the case of the production method 1 and the production method 2, the groups that can be converted into ion-exchange groups are uniformly distributed in the direction of thickness, and the thickness of the antistatic layer is adjusted depending upon the conditions of the hydrolyzing reaction. However, the conditions of the hydrolyzing reaction vary depending upon the concentration of an alkali, temperature, kind of organic solvent, amount of organic solvent, amount of groups that can be converted into ion-exchange groups and composition of the resin, and cannot be exclusively determined. Therefore, the thickness of the antistatic layer can be controlled to lie within a range of the present invention upon measuring in advance the conditions for the hydrolyzing reaction and the concentration in the direction of thickness of the antistatic layer formed by the hydrolysis.

In the above-mentioned production methods 1 and 2, a concentration gradient is so formed that the concentration of ion-exchange groups is high on the surface and decreases in the direction of thickness. It is, however, desired that the layer in which the concentration of ion-exchange groups is not smaller than 0.25 mol %, is not smaller than 1 μm. Under this antistatic layer, there may exist the base material in which the concentration of ion-exchange groups is smaller than 0.20 mol % and, particularly, not larger than 0.10 mol %. A transition layer in which the concentration of ion-exchange groups lie therebetween may exist between the antistatic layer and the base material, as a matter of course.

According to the production method 3 of the present invention, furthermore, the fluorine-containing resin having a group that can be converted into an ion-exchange group may be applied and melt-adhered and, then, the thickness of the antistatic layer may be adjusted depending upon the conditions of the hydrolyzing reaction, so as to accomplish a thickness which is desired for developing the effects of the present invention.

In the cases of the production methods 3 and 4, the precursor layer may be so treated that the concentration of the ion-exchange groups becomes uniform over the whole thickness, or may be so treated as to form a gradient of ion-exchange group concentration in the same manner as described with reference to the production methods 1 and 2.

It is desired that the hydrolysis is carried out over the whole surfaces of the fluorine-containing resin molded article. Depending upon the applications, the hydrolysis may be carried out on one surface only or on a portion of the surfaces.

Pair ions of the cation-exchange groups after the hydrolysis are Na ions, K ions or hydrogen ions. Here, however, a conventional method for conversion into other metal ions, hydrogen ions or ammonium ions can be employed without any problem.

As will be comprehended from the foregoing description, the ordinary fluorine-contained resin has a surface resistivity of not smaller than $10^{16}\Omega$ and a voltage attenuation factor after one hour of several percent, whereas the fluorine-containing resin molded article of the present invention has a surface resistivity of not larger than $10^{13}\Omega$ and a voltage attenuation factor of nearly 100% after several seconds. Thus, the fluorine-containing resin of the present invention is not substantially electrified.

Unlike the existing fluorine-containing resins, the fluorine-containing resin molded article having an antistatic layer obtained according to the present invention does not almost generate static electricity, and diffuses the static electricity when it is generated. The fluorine-containing resin molded article of the present invention does not substantially have ion-exchange groups in the base material. When immersed in a chemical solution therefore, the fluorine-containing resin molded article does not adsorb ions, inorganic matters or organic matters or does not permit the permeation thereof, and is not fouled with the chemical solution. Besides, the fluorine-containing resin molded article that is introduced into another chemical solution or water, does not cause such chemical solution or water to be fouled. Moreover, the fluorine-containing resin molded article does not undergo a dimensional change, thus exhibiting excellent properties inherent in the fluorine-containing resin.

Accordingly, the molded article of the present invention can be desirably used in the fields where generation of static electricity must be avoided such as production of semiconductors, food industries, chemical industries and in general fields of science and chemistry.

Concretely speaking, since no dirt and dust adhere electrostatically, the fluorine-contained molded article of the present invention can be favorably used as a tube for transporting chemical solutions, joint, valve, strainer, container for chemical solutions, tips of vacuum tweezers, peripheral parts for the production of semiconductors, jig for a wafer carrier, etc. In particular, the wafer carrier made of the fluorine-contained resin molded article of the present invention exhibits excellent antistatic property and not only suppresses fine particles suspended in the atmosphere from electrostatically adhering to the wafers to a sufficient degree but also suppresses percent defective of the wafers, since there occur no such problems as generation of particles, .fouling with impurity ions, etc.

When inflammable solutions are transported by using the tube (or pipe) of the present invention, no static electricity generates or builds up owing to the antistatic property. Accordingly, probability of catching fire is eliminated, particles do not generate, the resin is not swollen by the liquid that is transferred and does not permit the liquid being transferred to permeate therethrough.

Furthermore, in the field of the food manufacturing, using the molded article of the present invention prevents the problem of dust adhering for sanitary reasons.

(EXAMPLES)

The present invention will now be described in detail by way of Examples to which only, however, the invention is in no way limited.

The fluorine-containing resin molded article was measured for its surface resistivity, voltage attenuation factor and amount of adsorbing chemical solution in a manner as described below.

(1) Surface resistivity.

The surface resistivity was calculated in accordance with the following formula by taking measurement in compliance with JIS K-6911, $$\rho_s = \frac{\pi(D+d)}{D-d} \times R_s$$

where $\rho_S$: surface resistivity ($\Omega$), d: outer diameter of an inner circle of the surface electrode (cm), D: inner diameter of an annular electrode on the surface (cm), $R_S$: surface electric resistance ($\Omega$).

voltage, 500 V: measuring time, 30 sec., average of three times.

(2) Voltage attenuation factor.

By using a Static Honestometer S-5109 (manufactured by Shishido Shokai Co.), a voltage of 10 kV was applied for one minute, and the voltage was measured after the application of voltage was discontinued.

Resin size: 40×40×0.25 mm.

Attenuation factor =(Initial voltage−Voltage after a time t)/Initial voltage (unit in %).

(3) Amount of adsorbing chemical solution.

A test piece rinsed with ultra-pure water for 20 minutes was introduced into a one-liter quartz container that has been washed, and 500 ml of sulfuric acid for electronic industries was added thereto, followed by keeping at room temperature, so that the sulfuric acid was adsorbed by the test piece.

Then, the test piece was taken out, rinsed with ultra-pure water for 20 minutes, and 500 ml of ultra-pure water was added thereto and was heated at 80° C. After two hours have passed, the ultra-pure water was sampled, analyzed by ion chromatography, the amount of sulfuric acid contained in the ultra-pure water was calculated per a square centimeter of the test piece, and was regarded to be the amount of adsorbing chemical solution.

(Reference Example 1)

A 1,1,2-trichlorotrifluoroethane that has been refined in advance by distillation was introduced in an amount of 320 g into a 500-ml stainless steel reactor equipped with a stirrer, and the interior of the reactor was deaerated and was then filled with a nitrogen gas of an atmospheric pressure. Into the reactor was introduced 0.039 g of methanol and 33.5 g of $CF_2=CFOCF_2CF(CF_3)OCF_2CF_2SO_2F$, the stirrer motor was driven at a speed of 800 rpm, and a tetrafluoroethylene was introduced maintaining a pressure of 4 kg/cm²-G.

Then, 1.77 g of the 1,1,2-trichlorotrifluoroethane solution (5% by weight) of a bis(heptafluorobutyryl) peroxide was introduced while maintaining the interior of the reactor at 25° C. to initiate the polymerization. The polymerization was carried out maintaining a temperature of 25° C. After 120 minutes have passed from the start of the reaction, the pressure in the reactor was released, the reactor was connected to a vacuum pump via a cooling trap, the pressure was decreased with stirring, and low-boiling components such as solvent and unreacted monomer were recovered into the trap. After distillation, the reactor was disassembled, the copolymer was taken out and was dried in vacuum at 150° C. for 12 hours. There was obtained 24 g of the copolymer.

From the measurement of nuclear magnetic resonance spectrum and infrared-ray absorption spectrum, it was confirmed that the copolymer had been composed of 95.7 mol % of a monomer unit based upon the tetrafluoroethylene and 4.3 mol % of a monomer unit based upon $CF_2=CFOCF_2CF(CF_3)OCF_2CF_2SO_2F$. The specific melt viscosity of the copolymer at 372° C. was $4.6 \times 10^6$ poises.

(Example 1)

The copolymer obtained in Reference Example 1 was melt-molded into a film of a thickness of 0.25 mm, immersed in a solution of $NaOH/DMSO/H_2O=15/25/60\%$ by weight, and was hydrolyzed at 100° C. for 24 hours to form an antistatic layer. The amount of the ion-exchange groups in the film was examined to be about 4.3 mol % in the surface, about 0.28 mol % in a portion 10 μm deep from the surface, 0.08 mol % in a portion 20 μm deep from the surface, and 0.02 mol % near the central portion. Therefore, the antistatic layer in which the concentration of ion-exchange groups was not smaller than 0.25 mol % possessed a thickness of 10 μm.

Next, the film was measured for its surface resistivity to be $5.4 \times 10^8 \Omega$ and was further measured for its voltage attenuation factor to be 100% after a second. Moreover, the film was measured for its amount of adsorbing chemical solution to be 1.0 ppb/cm$^2$. The film was immersed in the ion-exchanged water overnight but elongation due to swelling was not observed.

Next, the film was boiled in isopropylalcohol for 168 hours and then was boiled in water for an hour. The amount of the ion-exchange groups in the film was examined to be the same as the amount before these boiling. The film was measured for its surface resistivity to be $9.2 \times 10^8 \Omega$ and was further measured for its voltage attenuation factor to be 100% after a second.

Next, the film was boiled in isopropylalcohol for 168 hours and then was boiled in water for an hour. The amount of the ion-exchange groups in the film was examined to be the same as the amount before these boiling. The film was measured for its surface electric resistivity to be $9.2 \times 10^8 \Omega$ and was further measured for its voltage attenuation factor to be 100% after a second.

The 0.25 mm-thick films obtained by the above-mentioned method were tested for their generation of particles. The testing was conducted in the following manner.

First, the films were cut into samples measuring 5 cm×10 cm, and were rinsed with ultra-pure water for 10 minutes in a clean room of a class 1000. Then, an isopropyl alcohol for electronic industries was introduced into the container, shook for 5 minutes and was left to stand. One day after, the isopropyl alcohol for electronic industries was replaced by a new one which was then shook for 5 minutes and was left to stand. The same replacement was repeated, and the number of particles ranging from 0.3 to 2 μm contained in the isopropyl alcohol was counted one day after, 7 days after and 14 days after by using a particle counter (KL-22 manufactured by RION Co. Ltd.). Particles were observed in a number of 750/ml one day after, in a number of 90/ml 7 days after, and in a number of 45/ml 14 days after.

The isopropyl alcohol for electronic industries used in the experiment contained particles in a number of from 20/ml to 40/ml.

For the purpose of comparison, a composition comprising 90% by weight of PFA, 5% by weight of electrically conducting carbon and 5% by weight of a powder of carbon fiber was mixed using a kneader-brabender heated at 350° C. for 20 minutes, and obtained the 0.25 mm thick film by the above mentioned method. The mixture was melted at 350° C. and was cooled under the application of pressure to form a sheet having a thickness of 0.25 mm. The obtained film was tested for its generation of particles.

Five pieces of samples measuring 5 cm×10 cm cut from the above film were tested for their generation of particles in the same manner as the above-mentioned method. As a result, particles were measured in a number of 1250/ml one day after, in a number of 1140/ml 7 days after and in a number of 960/ml 14 days after.

(Examples 2 to 4, Comparative Example 1)

In compliance with the method of producing the copolymer of Reference Example 1, four kinds of copolymers were obtained by changing the content of the groups that can be converted into ion-exchange groups and were melt-molded into films having a thickness of 0.25 mm in the same manner as in Example 1. The films were then immersed in a solution of $NaOH/DMSO/H_2O=15/25/60\%$ by weight, and were hydrolyzed at 100° C. for 24 hours to form the antistatic layers.

After the hydrolysis of the films, measurements were taken concerning the concentrations of ion-exchange groups in the surface of the antistatic layers, thicknesses of the layers in which the concentrations of ion-exchange groups were not smaller than 0.25 mol %, surface resistivities, voltage attenuation factors after a second, amounts of adsorbing chemical solution, and elongation due to swelling in the pure water. The results were as shown in Table 1.

TABLE 1

| | *1 (mol %) | *2 (μm) | Surface resistivity (Ω) | Voltage attenuation factor (after 1 sec) (%) | Amount of adsorbing chemical solution (ppb/cm$^2$) | Elongation due to swelling (%) |
|---|---|---|---|---|---|---|
| Example 2 | 0.4 | 10 | $5.5 \times 10^{10}$ | 88 | 0.8 | 0 |
| Example 3 | 10.3 | 12 | $3.4 \times 10^6$ | 100 | 3.3 | 0.2 |
| Example 4 | 15.8 | 11 | $1.0 \times 10^6$ | 100 | 3.8 | 0.2 |
| Comparative Example 1 | 0.1 | 12 | $>1 \times 10^{14}$ | 3 | 0.7 | 0 |

*1: Concentration of the ion-exchange groups in the surface of the antistatic layer
*2: Thickness of the layer in which the concentration of ion-exchange groups were not smaller than 0.25 mol %, in the antistatic layer (Examples 5 to 7)

Copolymers were obtained in the same manner as in Reference Example 1 but using monomers having groups that can be converted into ion-exchange groups shown in Table 2 in the method of producing the copolymer of Reference Example 1.

Next, the copolymers were melt-molded into films having a thickness of 0.25 mm in the same manner as in Example 1, immersed in a solution of NaOH/DMSO/$H_2O$=15/25/60% by weight, and were hydrolyzed at 100° C. for 24 hours.

Measurements were taken concerning the contents of ion-exchange groups in the surface of the antistatic layers, thicknesses of the layers in which the concentrations of ion-exchange groups were not smaller than 0.25 mol %, surface resistivities, voltage attenuation factors after a second, amounts of adsorbing chemical solution, and elongation due to swelling in the pure water. The results were as shown in Table 2.

weight, and were hydrolyzed at 100° C. for 24 hours. In the antistatic layer of the obtained film, the layer in which the concentration of ion-exchange groups was not smaller than 0.25 mol % possessed a thickness of 10 μm. The surface resistivity was measured to be 4.4×10$^8$Ω. The voltage attenuation factor was measured to be 100% after a second.

(Example 10)

The copolymer obtained in Reference Example 1 was melt-molded into a film having a thickness of 0.25 mm, immersed in a solution of NaOH/DMSO/$H_2O$=15/25/60% by weight, and was hydrolyzed at 100° C. for 24 hours. The film was immersed in a 1N hydrochloric acid solution and was stirred at 30° C. for 24 hours. In the antistatic layer of thus obtained film, the layer in which the concentration of

TABLE 2

| Precursor monomer | *1 (mol %) | *2 (μm) | Surface resistivity (Ω) | Voltage attenuation factor (after 1 sec) (%) | Amount of adsorbing chemical solution (ppb/cm$^2$) | Elongation due to swelling (%) |
|---|---|---|---|---|---|---|
| Ex. 5 $CF_2$=CFOCF$_2$CF$_2$SO$_2$F | 4.9 | 10 | 1.4 × 10$^8$ | 100 | 1.1 | 0.1 |
| Ex. 6 $CF_2$=CFOCF$_2$CF$_2$CF$_2$COOCH$_3$ | 4.2 | 10 | 7.5 × 10$^8$ | 100 | 2.9 | 0.2 |
| Ex. 7 $CF_2$=CFOCF$_2$CF$_2$OCF(CF$_3$)COOCH$_3$ | 4.0 | 12 | 2.7 × 10$^8$ | 100 | 1.1 | 0 |

1: Concentration of the ion-exchange groups in the surface of the antistatic layer
*2: Thickness of the layer in which the concentration of ion-exchange groups were not smaller than 0.25 mol %, in the antistatic layer (Example 8)

The copolymer obtained in Reference Example 1 was melt-molded into a film having a thickness of 0.25 mm, immersed in a solution of NaOH/DMSO/$H_2O$=15/25/60% by weight, and were hydrolyzed at 100° C. for 120 hours. In the antistatic layer of the obtained film, the layer in which the concentration of ion-exchange groups was not smaller than 0.25 mol % possessed a thickness of 40 μm.

The film was measured for its surface resistivity to be 1.6×10$^8$Ω and was further measured for its voltage attenuation factor to be 100% after a second. Moreover, the film was measured for its amount of adsorbing chemical solution to be 1.1 ppb/cm$^2$. The film was immersed in the ion-exchanged water overnight, and elongation due to swelling was 0.1%.

(Comparative Example 2)

The copolymer obtained in Reference Example 1 was melt-molded into a film having a thickness of 0.25 mm, immersed in a solution of NaOH/DMSO/$H_2O$=15/25/60% by weight, and were hydrolyzed at 100° C. for 1 hour. The antistatic layer of the obtained film possessed a thickness of 0.5 μm. The film was measured for its surface resistivity to be larger than 1×10$^{14}$Ω and was further measured for its voltage attenuation factor to be 4% after 5 minutes. Moreover, the film was measured for its amount of adsorbing chemical solution to be 0.8 ppb/cm$^2$. The film was immersed in the ion-exchanged water overnight, and elongation due to swelling was 0%.

(Example 9)

The copolymer obtained in Reference Example 1 was melt-molded into a film having a thickness of 0.25 mm, immersed in a solution of KOH/DMSO/$H_2O$=15/25/60% by ion-exchange groups was not smaller than 0.25 mol % possessed a thickness of 10 μm. The film was measured for its surface resistivity to be 1.1×10$^9$Ω and was further measured for its voltage attenuation factor to be 100% after a second.

(Example 11)

The film obtained in Example 10 was immersed in ammonia water and was stirred for 24 hours. The thus obtained film was measured for its surface resistivity to be 3.1×10$^9$Ω and was further measured for its voltage attenuation factor to be 100% after a second.

(Examples 12 to 14)

A polytetrafluoroethylene (hereinafter referred to as PTFE), or a copolymer of a tetrafluoroethylene and an alkyl vinyl ether (hereinafter referred to as PFA) or a copolymer of the tetrafluoroethylene and a hexafluoropropylene (hereinafter referred to as FEP) and the copolymer obtained in Example 4 were mixed together in the form of powders. The mixture was melt-molded into a film having a thickness of 0.25 mm, immersed in a solution of NaOH/DMSO/$H_2O$=15/25/60% by weight, and was hydrolyzed at 100° C. for 24 hours.

Measurements were taken concerning the mixing ratio of the base material to the fluorine-contained resin having a group that can be converted into an ion-exchange group, the content of ion-exchange groups in the surface of the antistatic layer of the obtained films, thicknesses of the layers in which the concentrations of ion-exchange groups are not smaller than 0.25 mol %, surface resistivities, voltage attenuation factors after a second, amounts of adsorbing chemical solution, and elongation due to swelling in the pure water. The results were as shown in Table 3.

TABLE 3

| | Mixing ration of resins | | | | Surface resis-tivity ($\Omega$) | Voltage attenuation factor (after 1 sec) (%) | Amount of adsorbing chemical solution (ppb/cm$^2$) | Elongation due to swelling (%) |
|---|---|---|---|---|---|---|---|---|
| | Base resin (wt %) | Antistatic resin (wt %) | *1 (mol %) | *2 ($\mu$m) | | | | |
| Ex. 12 | PTFE 59.7 | 40.3 | 4.8 | 10 | $1.3 \times 10^8$ | 100 | 1.2 | 0 |
| Ex. 13 | PFA 68.8 | 31.2 | 4.1 | 10 | $5.5 \times 10^8$ | 100 | 2.0 | 0 |
| Ex. 14 | FEP 62.1 | 37.9 | 4.5 | 12 | $3.9 \times 10^8$ | 100 | 1.2 | 0 |

1: Concentration of the ion-exchange groups in the surface of the antistatic layer
*2: Thickness of the layer in which the concentration of ion-exchange groups were not smaller than 0.25 mol %, in the antistatic layer (Examples 15 to 17)

The powder of the copolymer obtained in Reference Example 1 was uniformly adhered onto the surfaces of the films of PTFE, PFA and of the copolymer of the tetrafluoroethylene and $CF_2$=$CFOCH_2CF_2CF_3$ (containing 94 mol % of the tetrafluoroethylene). The films were introduced into the heating atmosphere in an electric furnace so that the powder only was melt-adhered onto the surfaces of the films. The films were immersed in a solution of NaOH/DMSO/$H_2O$=15/25/60% by weight, and was hydrolyzed at 100° C. for 24 hours to form antistatic layers.

Measurements were taken concerning the thicknesses of the layers in which the concentrations of ion-exchange groups were not smaller than 0.25 mol % in the antistatic layers of the obtained films, surface resistivities, voltage attenuation factors after a second, amounts of adsorbing chemical solution, and elongation due to swelling in the pure water. The results were as shown in Table 4.

TABLE 4

| | *2 ($\mu$m) | Surface resistivity ($\Omega$) | Voltage attenuation factor (after 1 sec) (%) | Amount of adsorbing chemical solution (ppb/cm$^2$) | Elongation due to swelling (%) |
|---|---|---|---|---|---|
| Example 15 | 10 | $4.9 \times 10^8$ | 100 | 0.9 | 0 |
| Example 16 | 10 | $5.1 \times 10^8$ | 100 | 1.2 | 0 |
| Example 17 | 10 | $2.2 \times 10^8$ | 100 | 1.0. | 0 |

*2: Thickness of the layer in which the concentration of ion-exchange groups were not smaller than 0.25 mol %, in the antistatic layer (Example 18)

The film obtained in Example 6 was immersed in a 1N hydrochloric acid solution and was stirred at 30° C. for 24 hours, so that the ion-exchange groups were of the acid type. The film was measured for its surface resistivity to be $2.1 \times 10^{12} \Omega$ and was further measured for its voltage attenuation factor to be 76% after one second.

(Reference Example 2)

A copolymer of 4.8 mol % of $CF_2$=$CFOCF_2CF(CF_3)$ $OCF_2CF_2SO_2F$ and 95.2 mol % of a tetrafluoroethylene was prepared in compliance with the production method of Reference Example 1.

(Example 19)

The copolymer obtained in Reference Example 2 was injection-molded into a wafer carrier for 6-inch use (having a capacity for holding 25 pieces of wafers as schematically diagramed in FIG. 1). The wafer carrier was immersed in a solution of NaOH/DMSO/$H_2O$=15/25/60% by weight, and was hydrolyzed at 100° C. for 24 hours.

The thus obtained wafer carrier was partly cut out, and was measured for this thickness of the layer in which the concentration of the ion-exchange groups was not smaller than 0.25 mol % in the antistatic layer to be 15 $\mu$m.

Wafers were set to the wafer carrier and were left to stand for 24 hours in a clean room of a class 1000. The number of the particles not smaller than 0.3 $\mu$m adhered to the whole surface of the wafer held at the end of the wafer carrier was five.

Next, the wafer carrier was measured for its surface resistivity to be $1.8 \times 10^8 \Omega$. Furthermore, the wafer carrier was partly cut out and was measured for its voltage attenuation factor to be 100% after one second.

(Comparative Example 3)

A wafer carrier was molded in the same manner as in Example 19 but using the commercially available PFA, and the wafers were set thereto and were left to stand for 24 hours in a clean room of a class 1000. The number of particles not smaller than 0.3 $\mu$m adhered to the wafer held at the end of the wafer carrier was about 300.

Next, the wafer carrier was measured for its surface resistivity to be larger than $1 \times 10^{14} \Omega$. Furthermore, the wafer carrier was partly cut out and was measured for its voltage attenuation factor to be 0.8% after 5 minutes and 6% after 30 minutes.

(Example 20)

By using the commercially available PFA, the wafer carrier same as that of Example 19 was obtained through the injection molding. The copolymer obtained in Reference Example 2 was electrostatically applied to the inside of an SUS metal mold that was in match with the wafer carrier. Then, the wafer carrier was put into the metal mold which was then put into an electric furnace heated at 350° C., so that the precursor was melt-adhered onto the surfaces of the wafer carrier. The wafer carrier was immersed in a solution of $(CH_3)_4N^+OH$—/DMSO/$H_2O$=15/25/60% by weight, and was hydrolyzed at 100° C. for 24 hours. The wafer carrier was cut at several portions and the concentration of the ion-exchange groups in the portions was measured. As results, the concentration near the surface was averages 4.8 mol %, and the concentration in a portion 80 μm deep from the surface was averages 3.8 mol %, and the concentration in a portion 100 μm deep from the surface was averages 0.05 mol %. Therefore, the antistatic layer in which the concentration of ion-exchange groups was not smaller than 0.25 mol % possessed a thickness of about 95 μm.

The surface resistivity was $2.1 \times 10^8 \Omega$ and the voltage attenuation factor was 100% after one second. Next, the wafer carrier was partly cut out and was tested for its amount of adsorbing chemical solution to be 1.8 ppb/cm$^2$.

(Example 21)

A wafer carrier was obtained in the same manner as in Example 20. The wafer carrier was cut at several portions and the concentration of the ion-exchange groups in the portions was measured. As results, the concentration near the surface was average 4.8 mol %, and the concentration in a portion 300 μm deep from the surface was averages 4.1 mol %, and the concentration in a portion 340 μm deep from the surface was averages 0.1 mol %. Therefore, the antistatic layer in which the concentration of ion-exchange groups was not smaller than 0.25 mol % possessed a thickness of about 330 μm. The surface resistivity of the wafer carrier was $2.1 \times 10^8 \Omega$, the voltage attenuation factor was 100% after one second, and the amount of adsorbing chemical solution was 35 ppb/cm$^2$.

(Example 22)

By using the commercially available PFA and the copolymer obtained in Reference Example 2, a tube having an outer diameter of 8 mm and an inner diameter of 6 mm was formed by the two-layer extrusion molding method. The tube was immersed in a solution of NaOH/DMSO/H$_2$O=15/25/60% by weight, and was hydrolyzed at 100° C. for 24 hours. The tube was cut open.

The surface resistivity was measured to be $4.1 \times 10^8 \Omega$ and the voltage attenuation factor was measured to be 100% after one second.

In this tube, the concentration of the ion-exchange groups near the surface was averages 4.7 mol %, and the concentration in a portion 50 μm deep from the surface was averages 3.8 mol %, and the concentration in a portion 70 μm deep from the surface was averages 0.1 mol %. Therefore, the antistatic layer in which the concentration of ion-exchange groups was not smaller than 0.25 mol % possessed a thickness of about 65 μm.

The tube was immersed in the pure water overnight, but no elongation due to swelling was observed in the lengthwise direction or in the direction of diameter.

Moreover, sulfuric acid for electronic industries was introduced into the tube to a length of 10 cm which was then introduced into a 200-ml quartz container containing ultra-pure water and was maintained at room temperature for 24 hours. The ultra-pure water was then analyzed by the ion chromatography, and the amount of permeating the chemical solution was calculated to be $5 \times 10^{-12}$ g.cm/cm$^2$.s.

(Comparative Example 4)

By using the copolymer obtained in Reference Example 2, a tube having an outer diameter of 8 mm and an inner diameter of 6 mm was obtained through the extrusion molding method. The tube was immersed in a solution of NaOH/DMSO/H$_2$O=15/25/60% by weight, and was hydrolyzed at 100° C. for seven days. The tube was cut open. The surface resistivity was measured to be $4.0 \times 10^8 \Omega$ and the voltage attenuation factor was measured to be 100% after one second.

The content of ion-exchange groups nearly at the center was 3.2 mol %. The tube was immersed in the pure water overnight, and was elongated due to swelling in the lengthwise direction and in the direction of diameter by 4.8% and 5.3%, respectively. The amount of permeating the chemical solution was $7 \times 10^{-9}$ g.cm/cm$^2$.s.

(Example 23)

A copolymer of $CF_2$=$CFOCF_2CF_2CF_2CO_2CH_3$ and a tetrafluoroethylene was obtained in the same manner as in Comparative Example 1. The copolymer contained a monomer unit due to $CF_2$=$CFOCF_2CF_2CF_2CO_2CH_3$ in an amount of 4.2 mol %. The copolymer was melt-molded into a film of a thickness of 0.35 mm. The film was heated in phosphorous pentachloride/phosphorous oxychloride at 120° C. for 24 hours. The film was then washed, dried, and was reacted with a dimethylamine in ether. Then, the film was reacted with sodium boron hydride in dry diglyme at 100° C. for 18 hours and was reduced, and was then reacted with methyl iodide in a methanol solution at 60° C. for 16 hours, so that the groups were converted into anion-exchange groups. As a result of IR analysis, the concentrations of ion-exchange groups were 3.8 mol %, 0.26 mol % and 0 mol % near the surface, at a portion 75 μm deep from the surface and at a portion 120 μm deep from the surface. The layer in which the concentration of ion-exchange groups was not smaller than 0.25 mol % in the antistatic layer possessed a thickness of 75 μm.

The obtained film was measured for its surface resistivity to be $4.5 \times 10^8 \Omega$ and was measured for its voltage attenuation factor to be 100% after one second.

(Example 24)

The copolymer obtained in Reference Example 1 was melt-molded into a film of a thickness of 0.25 mm, immersed in a solution of NaOH/DMSO/H$_2$O=15/25/60% by weight, and was hydrolyzed at 100° C. for 72 hours. As a result of IR spectrum measurement, the amounts of ion-exchange groups were 3.8 mol %, 3.7 mol %, 0.25 mol % and 0.01 mol % on the surface of the film, at a portion 50 μm deep from the surface, at a portion 60 μm deep from the surface and at a portion 70 μm deep from the surface. No ion-exchange group was detected near the central portion. Therefore, the layer in which the concentration of ion-exchange groups was not smaller than 0.25 mol % in the antistatic layer of the film possessed a thickness of 60 μm.

The film was measured for its surface resistivity to be $5.2 \times 10^8 \Omega$ and was further measured for its voltage attenuation factor to be 100% after one second. The amount of adsorbing chemical solution was 0.9 ppb/cm$^2$. When immersed in the ion-exchanged water overnight, the film elongated due to swelling by 0.1%.

(Comparative Example 5)

The copolymer obtained in Reference Example 1 was melt-molded into a film of a thickness of 0.25 mm, immersed in a solution of NaOH/DMSO/H$_2$O=15/25/60% by weight, and was hydrolyzed at 100° C. for 168 hours. As a result of IR spectrum measurement, the amounts of ion-exchange groups were 4.3 mol %, 1.0 mol % and 0.8 mol % on the surface of the film, at a portion 50 μm deep from the surface and near the central portion.

The film was measured for its surface resistivity to be $3.8 \times 10^8 \Omega$ and was further measured for its voltage attenuation factor to be 100% after one second. The amount of adsorbing chemical solution was 65 ppb/cm$^2$. When immersed in the ion-exchanged water overnight, the film elongated due to swelling by about 4.5%.

(Comparative Example 6)

A PTEE film having a thickness of 250 μm was immersed in a solution of methylene chloride comprising 20% by weight of $CF_2=CFOCF_2CF(CF_3)OCF_2CF_2SO_2F$, and then was irradiated with 2.5 Mrad radioactive ray to graft $CF_2=CFOCF_2CF(CF_3)OCF_2CF_2SO_2F$ on the surface of the film. The obtained film was immersed in a solution of NaOH/DMSO/H$_2$O=15/25/60% by weight, and was hydrolyzed at 100° C. for 24 hours to form the antistatic layer.

The film was measured for the amounts of ion-exchange groups to be about 0.2 mol % at the surface and to be 0 mol % at a portion 10 μm deep from the surface.

Next, the film was measured for its surface resistivity to be 1×10$^{14}$Ω, and was further measured for its voltage attenuation factor to be 1.8% after 5 minutes.

Five pieces of samples measuring 5 cm×10 cm cut from the above film were tested for their generation of particles in the same manner as Example 1. As results, particles were measured in number of 3920/ml one day after, in number of 1710/ml 7 days after and in number of 760/ml 14 days after.

We claim:

1. A fluorine-containing resin molded article having, on the surface of a base material composed of a fluorine-containing resin without substantially containing ion-exchange group and being impermeable for ions, an antistatic surface layer composed of a fluorine-containing resin of which the surface resistivity is adjusted to be not larger than 10$^{13}$Ω by making the presence of ion-exchange groups.

2. A fluorine-containing resin molded article according to claim 1, wherein in the antistatic layer, the ion-exchange groups which may be perfluoro cation-exchange groups or polyfluoro anion-exchange groups are chemically bonded to the fluorine-containing resin via a perfluorocarbon chain or a perfluoroether chain.

3. A fluorine-containing resin molded article according to claim 1, wherein the antistatic layer includes a layer of the fluorine-containing resin which contains ion-exchange groups at a concentration of not smaller than 0.25 mol %.

4. A fluorine-containing resin molded article according to claim 1, wherein when a voltage of 10 kV is applied for one minute, the voltage attenuation factor after one second is not smaller than 70%.

5. A fluorine-containing resin molded article according to claim 1, wherein said ion-exchange groups are perfluorosulfonic acid groups or groups of an alkali metal salt thereof or an ammonium salt thereof.

6. A fluorine-containing resin molded article according to claim 3, wherein the layer of the fluorine-containing resin which contains the ion-exchange groups at a concentration of not smaller than 0.25 mol % has a thickness of from 1 to 500 μm.

7. The fluorine-containing resin molded article according to claim 1, wherein the fluorine-containing resin molded article is a wafer carrier.

8. The fluorine-containing resin molded article according to claim 1, wherein the fluorine-containing resin molded article is a tube or a pipe.

9. The fluorine-containing resin molded article according to claim 8, wherein the base material has a thickness of not smaller than 10 μm.

10. The fluorine-containing resin molded article according to claim 1, wherein the fluorine-containing resin molded article is a film or a sheet.

11. The fluorine-containing resin molded article according to claim 10, wherein the base material has a thickness of not smaller than 10 μm.

* * * * *